E. G. WHEELER.
ICE-CREAM FREEZER.
No. 178,692. Patented June 13, 1876.
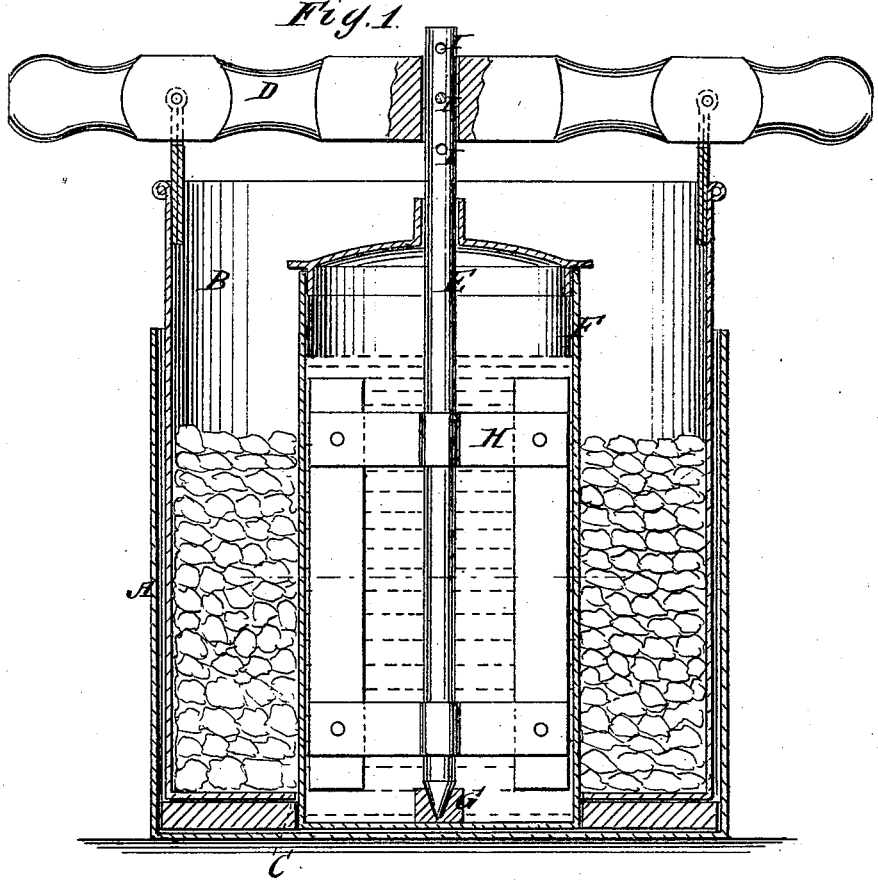
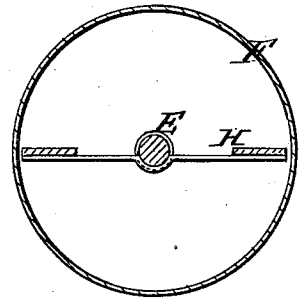

UNITED STATES PATENT OFFICE.

EDWARD G. WHEELER, OF MOBILE, ALABAMA.

IMPROVEMENT IN ICE-CREAM FREEZERS.

Specification forming part of Letters Patent No. 178,692, dated June 13, 1876; application filed May 16, 1876.

*To all whom it may concern:*

Be it known that I, EDWARD G. WHEELER, of the city and county of Mobile, Alabama, have invented a new and Improved Ice-Cream Freezer, of which the following is a specification:

My invention consists of an ice-can surrounding the cream-bucket, both of which are inside of an outer can, and suspended from the handles of the beater-shaft, so as to revolve with it, being supported on its pivot so as to turn easily, and it is so connected to the beater-shaft that, although only partly filled with ice, it can be made to freeze a full can of cream by shifting it up along the cream-bucket, after freezing the lower portion.

The beater can be taken out of the cream-bucket, and the ice-can may be revolved around it afterward, to freeze the cream solid.

In practice, the ice-can will be made of wood, and will have a wood cover, to economize the ice.

Figure 1 is a sectional elevation of my improved ice-cream freezer. Fig. 2 is a horizontal section of the cream-bucket and beater.

A is the outer can, which is to be of tin or other approved material. B is the ice-can, which, in practice, will be made of wood. It has a large opening, C, in the middle of the bottom, and it is attached at the top to the handle D of the beater-shaft E. F is the cream-bucket, which rests on the bottom of the outer can A, in the hole C in the bottom of the ice-can, and it has a step, G, in the center of the bottom, in which the point of the shaft E rests; and H is the cream-beater. The shaft has a series of holes in the upper part, to suspend the ice-can high or low, by a pin passing through the handle and the shaft, when it is desired to do the work with a small quantity of ice. The ice-can is wholly suspended on the pivot of the shaft, and thus has no friction, except by the ice and its weight on the pivot, so that it turns very easily, and thus makes a very efficient freezer. The ice-can is detachably connected to the beater-shaft handles, to facilitate the connecting and disconnecting of the handle.

Having thus described my invention, I claim as new and desire to secure by Letters Patent—

The ice-can B, having a hole in the bottom for the cream-bucket, and suspended from the handles of the beater-shaft, in combination with the cream-bucket and an outer can, A, substantially as specified.

EDWARD G. WHEELER.

Witnesses:
R. P. BAKER,
JNO. R. SIMPSON.